US009069884B2

(12) United States Patent
Dallari et al.

(10) Patent No.: US 9,069,884 B2
(45) Date of Patent: Jun. 30, 2015

(54) PROCESSING SPECIAL ATTRIBUTES WITHIN A FILE

(75) Inventors: Gregory D. Dallari, Poughkeepsie, NY (US); Thomas E. Murphy, Jr., Poughkeepsie, NY (US); Adiswong Puiam, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 12/555,171

(22) Filed: Sep. 8, 2009

(65) Prior Publication Data

US 2011/0060778 A1   Mar. 10, 2011

(51) Int. Cl.
*G06F 12/00* (2006.01)
*G06F 17/30* (2006.01)

(52) U.S. Cl.
CPC .... *G06F 17/30997* (2013.01); *G06F 17/30085* (2013.01); *G06F 17/301* (2013.01)

(58) Field of Classification Search
USPC .................................. 707/797, 589, 956, 829
See application file for complete search history.

(56) References Cited

U.S. PATENT DOCUMENTS

| | | | |
|---|---|---|---|
| 6,272,490 B1 * | 8/2001 | Yamakita | 1/1 |
| 6,311,194 B1 | 10/2001 | Sheth et al. | |
| 6,366,296 B1 | 4/2002 | Boreczky et al. | |
| 6,493,731 B1 | 12/2002 | Jones et al. | |
| 6,499,132 B1 | 12/2002 | Morley et al. | |
| 6,715,126 B1 | 3/2004 | Chang et al. | |
| 6,920,583 B1 | 7/2005 | Morley et al. | |
| 7,120,859 B2 | 10/2006 | Wettach | |
| 7,233,942 B2 | 6/2007 | Nye | |
| 7,698,336 B2 | 4/2010 | Nath | |
| 7,818,681 B2 | 10/2010 | Abuelsaad et al. | |
| 8,001,462 B1 | 8/2011 | Kupke et al. | |
| 8,055,688 B2 | 11/2011 | Giblin | |
| 8,060,514 B2 | 11/2011 | Arrouye et al. | |
| 8,082,486 B1 | 12/2011 | Damman et al. | |
| 8,126,936 B1 | 2/2012 | Giblin | |
| 2002/0152318 A1 * | 10/2002 | Menon et al. | 709/231 |
| 2003/0112268 A1 | 6/2003 | Wettach | |
| 2004/0122943 A1 * | 6/2004 | Error et al. | 709/224 |
| 2004/0168115 A1 * | 8/2004 | Bauernschmidt et al. | 715/500 |
| 2005/0097260 A1 | 5/2005 | McGovern et al. | |
| 2005/0108639 A1 * | 5/2005 | Fields et al. | 715/531 |

(Continued)

OTHER PUBLICATIONS

Document Properties: Security, retrieved from the internet on Sep. 4, 2009, http://www.isilox.com/support/manual/iSiloX/ReferenceManual/DocumentProperties/Security.htm, 3 pages.

(Continued)

*Primary Examiner* — Hosain Alam
*Assistant Examiner* — Van Oberly
(74) *Attorney, Agent, or Firm* — Cantor Colburn LLP; William A. Kinnaman, Jr.

(57) ABSTRACT

A computer-implemented method, system, and computer program product for processing special attributes within a file are provided. The method includes accessing the file with a hierarchical tree structure of file elements, and retrieving special attributes associated with the file elements. The special attributes are selectively assigned to the file elements. The method also includes interpreting the special attributes using hierarchical inheritance to pass the special attributes from subordinate file elements to higher-level file elements. The method further includes creating a file-level representation of the interpreted special attributes.

19 Claims, 6 Drawing Sheets

(56) References Cited

U.S. PATENT DOCUMENTS

| | | | |
|---|---|---|---|
| 2005/0198042 A1* | 9/2005 | Davis | 707/10 |
| 2006/0149807 A1* | 7/2006 | Ding et al. | 709/203 |
| 2006/0218492 A1 | 9/2006 | Andrade | |
| 2007/0010993 A1 | 1/2007 | Bachenko et al. | |
| 2007/0150513 A1 | 6/2007 | Vanden Heuvel et al. | |
| 2008/0034003 A1* | 2/2008 | Stakutis et al. | 707/200 |
| 2008/0040359 A1 | 2/2008 | Arrouye et al. | |
| 2009/0006982 A1 | 1/2009 | Curtis et al. | |
| 2009/0049391 A1 | 2/2009 | Abuelsaad et al. | |
| 2009/0070373 A1* | 3/2009 | Jeong et al. | 707/104.1 |
| 2009/0150406 A1 | 6/2009 | Giblin | |
| 2009/0157680 A1 | 6/2009 | Crossley et al. | |
| 2009/0327789 A1 | 12/2009 | Zerbe et al. | |
| 2010/0077290 A1 | 3/2010 | Pueyo | |
| 2010/0153106 A1 | 6/2010 | Frazier et al. | |
| 2010/0228693 A1 | 9/2010 | Dawson et al. | |
| 2010/0235760 A1 | 9/2010 | Goh | |
| 2011/0067087 A1 | 3/2011 | Thornton et al. | |
| 2012/0047436 A1 | 2/2012 | Giblin | |
| 2012/0072845 A1 | 3/2012 | John et al. | |
| 2013/0047071 A1 | 2/2013 | Haubrich et al. | |

OTHER PUBLICATIONS

Expired Documents; retrieved from the internet on Sep. 4, 2009: http://www.jivesoftware.com/community/docs/DOC-1804, 1 page.

FileNet Content Manager; retrieved from the interent on Sep. 4, 2009; http://www-01.ibm.com/software/data/content-management/filenet-content-manager/, 3 pages.

iSilo features; retrieved from the internet on Sep. 4, 2009, http://www.isilo.com/info/features.htm, 10 pages.

Metadata Miner Catalogue PRO; retrieved from the internet on Sep. 4, 2009; http://metadataminer.com/, 7 pages.

O. Alonso, "Temporal Information Retrieval", PhD thesis, UC Davis Computer Science, 2008; UC Davis Computer Science Department; Aug. 2008; pp. 1-155.

M. Negri, et al., "Recognition and Normalization of Time Expressions: ITC-irst at TERN 2004", Centro per la Ricerca Scientifica e Technolgica via Sommarive 18, 38050, Povo(TN), Italy; Feb. 2, 2005; pp. 1-8.

Great Britain Search Report: Application No. GB1217190.6; dated Mar. 19, 2013; 5 pages.

International Search Report—Great Britain: Application No. GB1217190.6; dated Mar. 19, 2013; 5 pages.

* cited by examiner

PROCESSING SPECIAL ATTRIBUTES WITHIN A FILE

BACKGROUND

The present invention relates generally to computer file management, and more specifically, to inserting, identifying and conveying special attributes, such as associating expiration dates to file sub-elements within a computer file.

Information within a document can become obsolete making the overall document invalid or in need of maintenance, in addition to making referencing documents or file objects also invalid. Here, documents can refer to any type of file including subcomponents. Examples include text files, media files, web pages, and the like. Keeping documents up to date is a growing challenge due to manual tracking and reviews involved, particularly for documents with underlying dependent references to subdocuments. Conversely, the consequences of document content being outdated represents data integrity concerns, which often makes an entire document suspect of erroneous data therein compromising the overall credibility of the document and the person referencing the date-sensitive material. Contributing factors to increasing incorporation of outdated materials in documents include exponential growth in the number of documents produced, encouragement to reference, and reuse of documents, which can be further complicated by government regulations and oversight.

Visible attributes associated with computer files typically track and present information to file systems at the file level. Examples of such attributes include filename, file owner, and file size. Date and time related information that may be stored as file metadata include the date/time that the file was created, last modified, and last accessed.

SUMMARY

An exemplary embodiment is a computer-implemented method for processing special attributes within a file. The method includes accessing the file with a hierarchical tree structure of file elements, and retrieving special attributes associated with the file elements. The special attributes are selectively assigned to the file elements. The method also includes interpreting the special attributes using hierarchical inheritance to pass the special attributes from subordinate file elements to higher-level file elements. The method further includes creating a file-level representation of the interpreted special attributes.

Another exemplary embodiment is a system for processing special attributes within a file. The system includes data storage to hold the file and special attribute logic configured to execute on a processing unit. The special attribute logic is configured to access the file with a hierarchical tree structure of file elements, and retrieve special attributes associated with the file elements. The special attributes may include one or more of an expiration attribute indicating a date that a selected file element is scheduled to expire. The special attribute logic is further configured to interpret the special attributes using hierarchical inheritance to pass the special attributes from subordinate file elements to higher-level file elements, and create a file-level representation of the interpreted special attributes.

A further exemplary embodiment is a computer program product for processing special attributes within a file. The computer program product includes a storage medium readable by a processing circuit and storing instructions for execution by the processing circuit for implementing a method. The method includes accessing the file with a hierarchical tree structure of file elements, and retrieving special attributes associated with the file elements. The special attributes are selectively assigned to the file elements. The method further comprises interpreting the special attributes using hierarchical inheritance to pass the special attributes from subordinate file elements to higher-level file elements, and creating a file-level representation of the interpreted special attributes.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments of the present invention facilitate setting of special attributes for file elements within a file. The file elements can include any logical subdivision of a file, including sub-elements within elements. Examples of file elements include pages, sections, embedded objects, object references, images, paragraphs, phrases, words, and the like. The special attributes can be selectively assigned to particular file elements with inherited attributes cascaded up through a hierarchical structure of file elements in the file. Special attributes may be stored in file metadata as one or more summary values for ease of accessibility such that files do not have to be repeatedly opened and read to determine special attribute values. For example, a special attribute assigned to an embedded object can be visible at the file level, enabling rapid analysis of special attributes from the file system level. Special attributes may be accessed and assigned directly by a file system or a file editor. Special attributes can also be stored as intra-file metadata embedded within a file.

One type of special attribute is an expiration attribute. Expiration attributes can be assigned to show exactly which file elements within a file are expired or need attention. Expiration attributes can be assigned to various file elements. The expiration attributes are used to warn of expired or nearly expired information within a file relative to reference date. The reference date can be an input indicating hypothetical date for maintenance operations or the system calendar. A file editor accesses the expiration attributes to identify file elements that require attention or modification and enables a user to reset the expiration attributes. A file system can also access the expiration attributes within a file, which may assist in searching for materials in need of updating across multiple files and storage systems.

Figure 1:
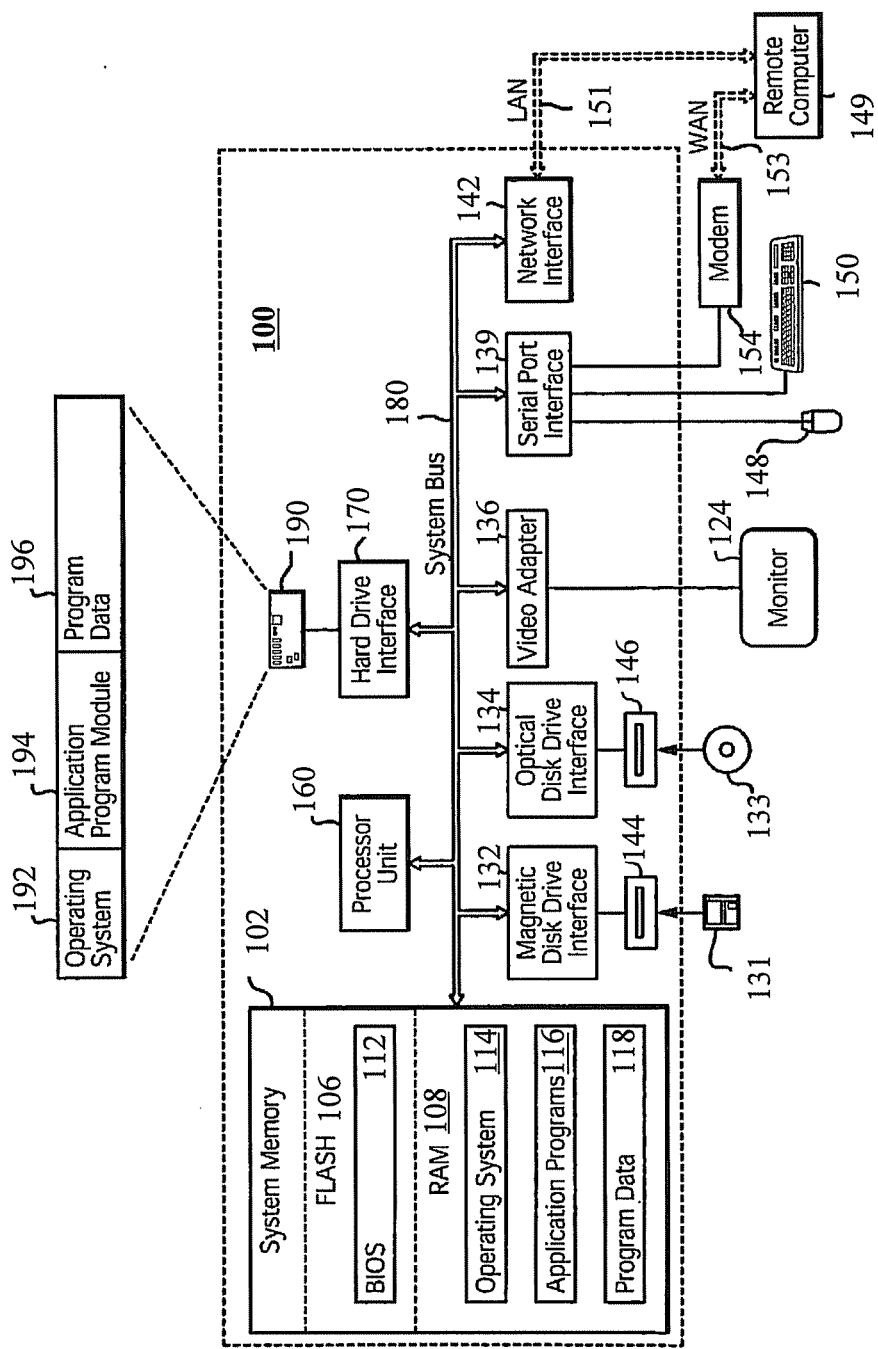
FIG. 1 depicts a block diagram illustrating an exemplary computer processing system that may be utilized to implement exemplary embodiments of the present invention.

Turning now to the drawings, it will be seen that in FIG. 1 there is a block diagram of a processing system 100 upon which a special file attribute system can be implemented in exemplary embodiments. For discussion purposes, the processing system 100 is described as having features common to a personal computer, such as a desktop or portable computer. As used herein, however, the terms "processing system," "computer," and the like are intended to mean essentially any type of computing device or machine that is capable of receiving, storing, and running a software product, including such devices as communication devices and personal and home consumer devices supporting file storage and retrieval.

Processing system 100, as provided in FIG. 1, is configured as a personal computer that generally includes a processing unit 160 (or processing circuit), a system memory 102, and a system bus 180 that couples system memory 102 to processing unit 160. The system memory 102 includes non-volatile memory 106 and random access memory (RAM) 108. Non-volatile memory 106 is an electrically erasable programmable read only memory (EEPROM) module that includes a basic input/output system (BIOS) 112, which may be implemented in flash memory. BIOS 112 contains the basic routines that facilitate transfer of information between elements within processing system 100, such as during start-up.

Processing system 100 further includes a hard disk drive 190, a magnetic disk drive 144 (which can be used to read from or write to a removable disk 131), and an optical disk drive 146 (which can be used to read a CD-ROM disk 133 or read or write to other optical media). Hard disk drive 190, magnetic disk drive 144, and optical disk drive 136 are electrically communicatively coupled to system bus 180 by a hard disk drive interface 170, a magnetic disk drive interface 132, and an optical drive interface 134, respectively. The drives and their associated computer-readable media provide non-volatile storage for processing system 100. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments. Likewise, one or more of the hard disk drive 190, magnetic disk drive 144, and optical disk drive 146 can be omitted within the scope of the invention.

A number of program modules may be stored in the drives and RAM 108, including an operating system 114, application program modules 116 (such as, for example, development applications), and program data 118. A user may enter commands and information into processing system 100 through a keyboard 150 and/or a mouse 148. Other input devices (not shown) may include, for example, a microphone, joystick, game pad, satellite dish, scanner, or the like. These and other input devices are often connected to processing unit 160 through a serial port interface 139 that is coupled to system bus 180, but may be connected by other interfaces, such as a game port or a universal serial bus (USB). A monitor 124 or other type of display device is also connected to system bus 180 via an interface, such as a video adapter 136. In addition to the monitor, the exemplary computer operating environment may also include other peripheral output devices (not shown), such as speakers or printers.

Processing system 100 may operate in a networked environment using logical connections to one or more remote computers, such as a remote computer 149. Remote computer 149 may be, for example, a server, a router, a peer device, or another common network node, and may include many or all of the elements described in relation to processing system 100. The logical connections depicted in FIG. 1 include a local area network (LAN) 151 and a wide area network (WAN) 153.

When used in a LAN networking environment, processing system 100 is connected to LAN 151 through a network interface 142. When used in a WAN networking environment, processing system 100 includes a modem 154 or other means for establishing communications over WAN 153, such as the Internet. Modem 154, which may be internal or external to processing system 100, is connected to system bus 180 via serial port interface 139. In a networked environment, program modules depicted relative to processing system 100, or portions thereof, may be stored in the remote memory storage device. It will be appreciated that the network connections shown are exemplary and other means of establishing a communications link between the computers may be used.

Figure 2:
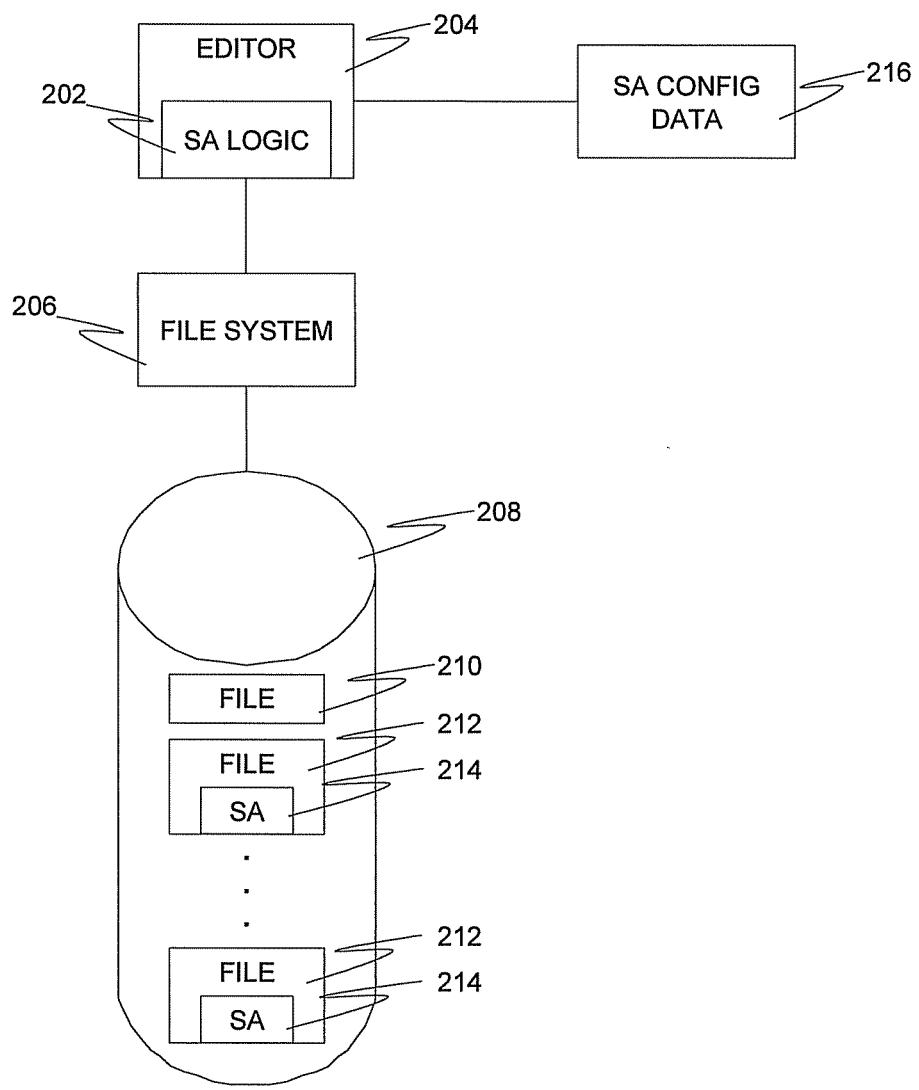
FIG. 2 depicts an example of a special file attribute system in accordance with exemplary embodiments.

FIG. 2 depicts an example of a special file attribute system 200 in accordance with exemplary embodiments, which may be implemented on the processing system 100 of FIG. 1. In exemplary embodiments, the special file attribute system 200 includes special attribute logic 202, an editor 204, a file system 206, and data storage 208. Data storage 208 can include both files 210 that do not include special attributes and files 212 with special attributes 214. Data storage 208 can be implemented locally on the hard disk drive 190 of FIG. 1, remotely on the remote computer 149 of FIG. 1, or distributed using other storage systems known in the art. The special file attribute system 200 may also include special attribute configuration data 216 to define special attribute parameters, file types, associations and actions. The special attribute configuration data 216 can be part of an operating system registry or configuration file, which may also be stored in data storage 208. In an exemplary embodiment, the special attribute configuration data 216 includes a dynamically created mapping of special attributes 214 relative to associated file elements.

When implemented on the processing system 100 of FIG. 1, the user can view the monitor 124 and use one or more of the keyboard 150 and/or mouse 148 to set values and/or identify values associated with the special attributes 214 in the files 212 using the editor 204 and special attribute logic 202. The processor unit 160 of FIG. 1 executes instructions to implement the functions of the special attribute logic 202, editor 204, and file system 206. In an exemplary embodiment, the special attribute logic 202 is a plug-in for the editor 204. In alternate embodiments, the special attribute logic 202 may be implemented in a module or separate application.

In the example depicted in FIG. 2, a document author interfaces to the special attribute logic 202 through the editor 204, where the editor 204 is a document editor application. The document author can select a file element within a document and right click to set properties or attributes associated with the selected file element. A dialog box may be used to solicit user input, such as text boxes and input fields for the special attributes 214. The document author may then assign a variety of features to the selected file element within the document, in addition to selecting other file elements.

The special attribute logic 202 supports numerous special attributes that can be assigned to file elements. The special attributes 214 can represent contextual properties associated with a word, phrase or sub-element in files 212. An example of the special attributes 214 is an expiration date that is selectively assigned to one or more file sub-elements. The expiration attribute may be used to trigger other events, such as generating a warning that the associated file element is nearly outdated or is outdated. Selection of file elements for assigning the special attributes 214 can be performed using editor 204 to access special attribute logic 202. The file system 206 may also or alternatively support direct assignment of the special attributes 214 to file elements and sub-elements.

In an exemplary embodiment, the special attribute logic 202 includes a maintenance interface option to scan an entire document for expiration attributes and generate a complete expiration report. The expiration report can be interactive with an ability to make or request updates to the expired file elements. The maintenance interface can also establish test scenarios, by using a user specified hypothetical date/time instead of using the system calendar within the processing system 100 of FIG. 1 to check for expiration-related issues.

The special attribute logic 202 can also include security features to limit which users can modify and/or view the special attributes 214 in the files 212. Security can be enforced using password and/or user identification for authorized activities. The special attribute configuration data 216 may hold user security policies and constraints for the security features.

Figure 3:
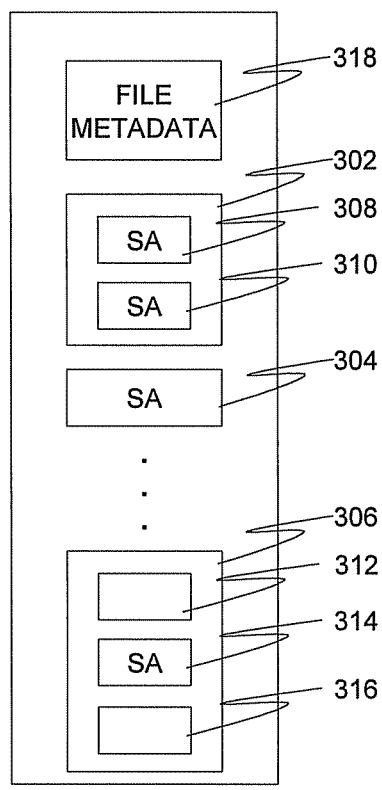
FIG. 3 depicts an example of file structure including special attributes in accordance with exemplary embodiments.

FIG. 3 depicts an exemplary file structure 300 that incorporates special attributes. The file structure 300 represents an example structure of the files 212 with special attributes 214 of FIG. 2. The file structure 300 can be organized in a sequential and hierarchical format, where file elements include one or more levels of sub-elements. In the example of FIG. 3, the file structure 300 includes file elements 302, 304, and 306 at the top level of the file hierarchy. File elements 308 and 310 are sub-elements of file element 302. File elements 312, 314, and 316 are sub-elements of file element 306, while file element 304 does not include any sub-elements. The file elements 302-316 can represent any subdivision of a file, such as a page, a section, an embedded object, an object reference, a paragraph, an image, a phrase, or a word. Note, for illustrative purposes, the example of documents is used; however, it will be understood that the invention is not limited to such file structures and applies to any storable electronic content. File metadata 318 may include information about the partitioning, location, and contents of the file elements 302-316. As depicted in FIG. 3, a select subset of the file elements 302-316 have special attributes including file elements 304, 308, 310 and 314. The special attributes in file elements 304, 308, 310 and 314 may collectively represent the special attributes 214 of FIG. 2.

Figure 4:
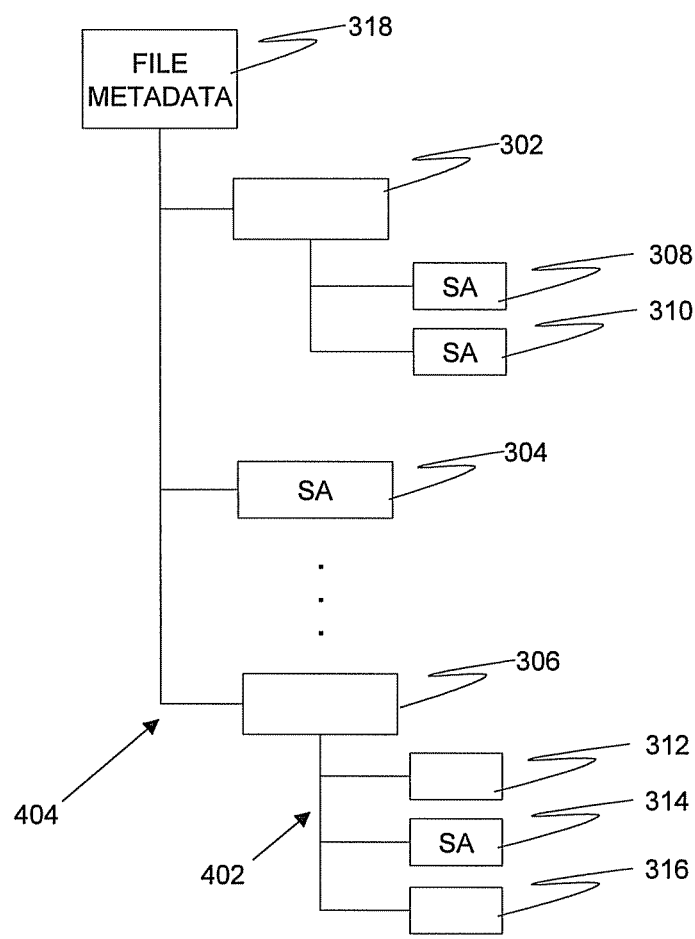
FIG. 4 depicts the file structure of FIG. 3 in a hierarchical tree structure in accordance with exemplary embodiments.

FIG. 4 depicts the file structure 300 of FIG. 3 in a hierarchical tree structure 400, graphically illustrating that file elements 308-316 are subordinate file elements 402 with respect to file element 302 and 306 as higher-level file elements 404. Once subordinate file elements 402 have been assigned expiration attributes, associated higher-level file elements 404 automatically inherit the underlying expiration attributes using hierarchical inheritance. For example, file element 308 may be a text box on a page associated with file element 302, where the page inherits the expiration attribute of the text box on the page. The same hierarchical inheritance can apply for any special attribute. Lower-level special attributes can be rolled up higher levels until available to the file metadata 318 as a file attribute. Special attributes may be saved to a table embedded within the file metadata 318 to quickly access the special attributes without walking the hierarchical tree structure 400.

A table can be constructed in the file metadata 318 to indicate where special attributes apply. The table may contain a number of columns as illustrated in Table 1 below. In Table 1, "ID" is a unique identifier for a file element. "Location" is the location of the file element including start and end offsets. "Expiration" indicates the expiration attribute of the file element. An indicator can also be included in the table to describe the special attributes. The indicator may be represented as bit map, where each bit represents whether a specific special attribute is set.

TABLE 1

Example Metadata Table

| ID | Location | Expiration |
| --- | --- | --- |
| A0 | Page2 + Offset 50 to Offset 90 | 12/31/2008 14:30 |
| A1 | Page1 + Offset 10 to Offset 15 | 10/10/2009 13:00 |
| A2 | Page 3 | 12/25/2009 8:00 |

As a further extension or alternative embodiment, special delimiters can be used to separate displayable/viewable contents from special attributes 214 in the files 212. Thus, special attributes 214 can be stored directly in the file metadata 318 or the file metadata 318 can contain location information identifying the location of special attribute data, e.g., identifying file elements 304, 308, 310, and 314. Table 1 provides an illustrative example; however, the actual content of Table 1 can be encoded in an extensible mark-up language (XML) format for compatibility with other metadata formats. XML format is a standardized format that supports grouping special attributes to a specific file element, such as a paragraph. An example of an in-line embedded XML code segment for special attributes with intra-file metadata embedded within a file is provided as follows:

```
<paragraph>
<id name=A0>
<location>Page2 + Offset 50 to Offset 90</location>
<expiration>12-31-2008-14:30</expiration>
This is my text object that I have marked.
</id>
</paragraph>
```

In an exemplary embodiment, existing file metadata 318 is augmented to include special attributes. Depending upon file format, some file types may include flexibility to add special attributes within existing file structures. For example, storage of interchange information in image files for Exchangeable Image File Format (EXIF) includes a configurable substructure to which special attributes can be added. With an EXIF editor as the editor 204 of FIG. 2, stored special attributes can be accessed and viewed.

In another embodiment, a presentation-formatted file (e.g., ".PPT") can leverage self-contained attributes of overall file components or objects as file elements and sub-elements. The editor 204 of FIG. 2 can readily assess, reflect for maintenance, or reflect all pages having an associated special attribute by walking the file metadata 318 and underlying hierarchical structure 400. The editor 204 may use the special attribute logic 202 to identify a least common denominator, such as an earliest expiration attribute regardless of location within file 212 and reflect this as the overall file expiration date. Making the file expiration date visible to the file system 206 enables external searching and sorting of files as a function of the expiration date or other special attributes of file elements. Alternatively, summarized special attribute data can be stored in a retention tree structure.

In further embodiments, existing file properties can be used to hold the special attributes 214 of the files 212 of FIG. 2. For instance, some files 212 support a "comment" field, where text information can be stored within the files 212. The comment field can be used to store the special attributes 214. Using existing file properties to hold the special attributes 214 enables the file system 206 to access and modify the special attributes 214 directly without modification to the file system 206.

As another alternative, the special attributes 214 can be stored and managed in separate files in data storage 208. The special attribute logic 202 assists the editor 204 in locating and interpreting the special attributes 214. The special attribute logic 202 can use the special attribute configuration data 216 to determine and apply location and interpretation rules for the special attributes 214.

Figure 5:
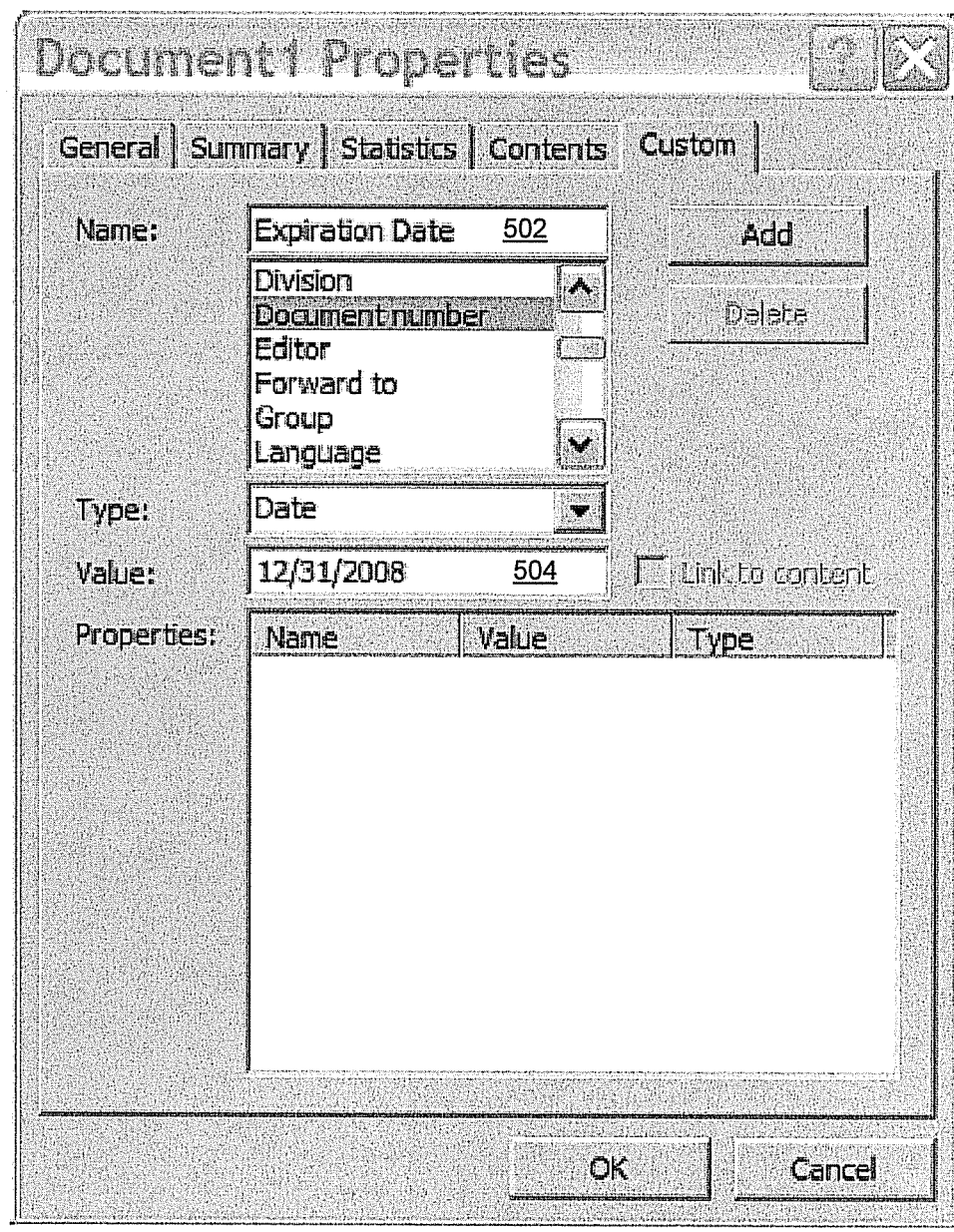
FIG. 5 depicts an example of user interface to manually configure special attributes in accordance with exemplary embodiments.

Existing document formats that support custom properties can be further enhanced to add special attributes. FIG. 5 depicts an example of user interface 500 to configure special attributes in accordance with exemplary embodiments. An expiration date property 502 is shown in FIG. 5 as a custom property with a configurable date field 504. The date field 504 can be established either via the user interface 500 or upon saving the associated file to data storage 208 of FIG. 2. The date field 504 may also be updated by the special attribute logic 202 of FIG. 2 upon determining which underlying file element will expire first. Other dialog boxes can also be triggered to assign special attribute values to specific file elements. As files are saved, the expiration attributes can be sorted reflecting the earliest expiration date externally to the editor 204 and file system 206 of FIG. 2.

Figure 6:
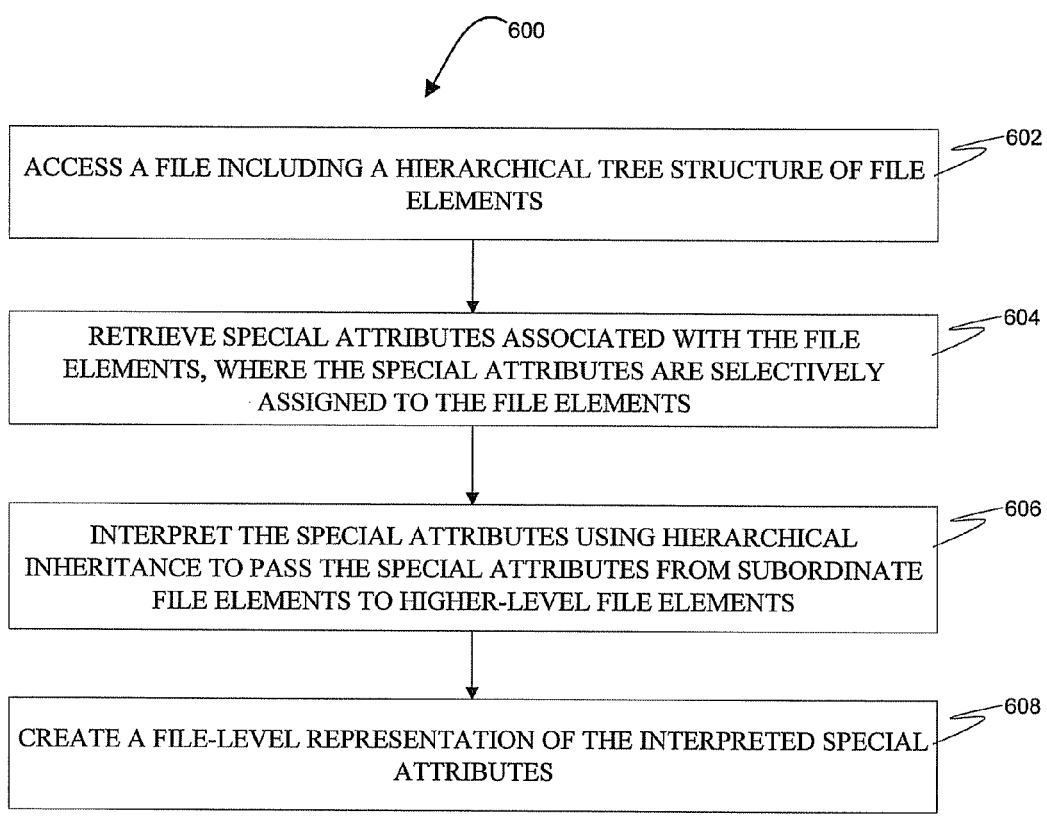
FIG. 6 depicts an exemplary process for processing special attributes within a file in accordance with exemplary embodiments.

Turning now to FIG. 6, a process 600 for processing special attributes within a file will now be described in accordance with exemplary embodiments, and in reference to FIGS. 1-5. At block 602, the special attribute logic 202 accesses a file 212 that includes special attributes 214. The file 212 has an associated hierarchical tree structure 400 of file elements 302-316. The special attribute logic 202 may be plug-in logic interfacing with editor 204 that enables a user to assign values and associations with the file elements 302-316 via a user interface, such as user interface 500.

At block 604, the special attribute logic 202 retrieves special attributes 214 associated with the file elements 302-316. The special attributes 214 may be selectively assigned to file elements 304, 308, 310, and 314. The special attributes 214 can include one or more instances of an expiration attribute indicating a date that a selected file element is scheduled to expire.

The special attribute logic 202 can compare various special attributes values, such as comparing a sub-element expiration date to an editor-specified reference date. With associated editor configuration or preferences, various ranges of expiration can be highlighted for viewing via the editor 204. For instance, a threshold amount can indicate that a selected file element is about to expire or has expired. The specific highlighting/rendering may vary according to how close the expiration special attribute is compared to the reference date. Special attributes with a longer time horizon may warrant a different rendering.

Modifications of the special attributes 214 can be limited according to a security policy, which may be defined in the special attributes configuration data 216. The special attribute logic 202 can read the special attribute configuration data 216 and use the special attribute configuration data 216 to identify and interpret the special attributes 214. At block 606, the special attribute logic 202 interprets the special attributes 214 using hierarchical inheritance to pass the special attributes 214 from subordinate file elements 402 to higher-level file elements 404.

At block 608, the special attribute logic 202 creates a file-level representation of the interpreted special attributes. The file-level representation of the interpreted special attributes can be stored in the file metadata 318. Alternatively or in addition, the file metadata 318 can include an index or offsets to locate the special attributes 214 within the file 212. The file-level representation of the interpreted special attributes may indicate an earliest expiration date of all expiration attributes associated with the file elements 302-316. The special attribute logic 202 can also generate an interactive expiration report and trigger an update of expired file elements in the interactive expiration report in response to an update request comparing to a reference date. The reference date can be a hypothetical date established during maintenance operations or the actual date based on a system calendar.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized, such as any of type of memory depicted in FIG. 1 to store instructions for execution of the special attribute logic 202 of FIG. 2. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include setting, identifying and conveying special attributes, including an expiration date, within a computer file. Having the ability to set special attributes (either explicitly or automatically) within a computer file provides additional features to help simplify the act of editing and maintaining document currency. Special attributes can be assigned to file elements within the computer file to bring focus to a document (or media) object in a meaningful way to the user/editor.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A computer-implemented method for processing special attributes within a file, comprising:
   accessing a file comprising a hierarchical tree structure of file elements;
   retrieving a plurality of special attributes, each of the special attributes being associated with one of the file elements, wherein the special attributes are selectively assigned to the file elements and at least one of the plurality of special attributes represent an expiration date associated with the assigned file element;

interpreting the special attributes using hierarchical inheritance to pass the special attributes from subordinate file elements to higher-level file elements;

creating a file-level representation of the interpreted special attributes, wherein the file-level representation of the interpreted special attributes indicates an earliest expiration date of the expiration dates associated with the file elements;

storing the file-level representation of the interpreted special attributes in a metadata associated with the file, wherein the metadata includes an index for locating each of the plurality of special attributes within the file;

based on a comparison of the expiration date to a reference date generating a warning that a selected file element is scheduled to expire; and wherein modification of the special attributes associated with the file elements is limited according to a security policy.

2. The method of claim 1:

wherein the metadata is accessible by one or more of a file system and an editor.

3. The method of claim 1 wherein the special attributes further comprise one or more instances of an expiration attribute indicating a date that a selected file element is scheduled to expire.

4. The method of claim 3 further comprising:

displaying contents of the file in an editor; and highlighting the selected file element according to a highlighting setting in the editor in response to a reference date being within a threshold amount of the date that the selected file element is scheduled to expire as defined by the expiration attribute.

5. The method of claim 3 wherein the file-level representation of the interpreted special attributes indicates an earliest expiration date of all expiration attributes associated with the file elements.

6. The method of claim 5 wherein the special attributes are stored as intra-file metadata embedded within the file.

7. The method of claim 3 further comprising:

generating an interactive expiration report; and triggering an update of expired file elements in the interactive expiration report in response to an update request.

8. The method of claim 1 wherein the special attributes are assigned values and associations with the file elements via a user interface managed by plug-in logic interfacing with an editor.

9. A system for processing special attributes within a file, comprising:

data storage to hold the file; and special attribute logic configured to execute on a processing unit, wherein the special attribute logic is configured to perform a method comprising:

accessing a file comprising a hierarchical tree structure of file elements;

retrieving a plurality of special attributes, each of the special attributes being associated with one of the file elements, at least one of the plurality of special attributes comprising an expiration date associated with one of the file elements;

interpreting the special attributes using hierarchical inheritance to pass the special attributes from subordinate file elements to higher-level file elements;

creating a file-level representation of the interpreted special attributes, wherein the file-level representation of the interpreted special attributes indicates an earliest expiration date of the expiration dates associated with the file elements;

scanning the file-level representation of the interpreted special attributes to generate an expiration report using a hypothetical date and time different from a system calendar;

storing the file-level representation of the interpreted special attributes in a metadata associated with the file, wherein the metadata includes an index for locating each of the plurality of special attributes within the file;

based on a comparison of the expiration date to a reference date generating a warning that a selected file element is scheduled to expire; and wherein modification of the special attributes associated with the file elements is limited according to a security policy.

10. The system of claim 9 wherein the metadata is accessible by one or more of a file system and an editor.

11. The system of claim 9 wherein the special attribute logic is further configured to perform:

highlighting the selected file element according to a highlighting setting in an editor in response to a reference date being within a threshold amount of the date that the selected file element is scheduled to expire as defined by the expiration date.

12. The system of claim 9 wherein the file-level representation of the interpreted special attributes indicates an earliest expiration date of all expiration dates associated with the file elements.

13. The system of claim 12 wherein the special attributes are stored as intra-file metadata embedded within the file.

14. The system of claim 9 further comprising special attribute configuration data, wherein the special attribute logic is further configured to perform:

reading the special attribute configuration data; and using the special attribute configuration data to identify and interpret the special attributes.

15. A computer program product for processing special attributes within a file, the computer program product comprising:

a non-transitory storage medium readable by a processing circuit and storing instructions for execution by the processing circuit for implementing a method, the method comprising:

accessing a file comprising a hierarchical tree structure of file elements;

retrieving a plurality of special attributes, each of the special attributes being associated with one of the file elements, wherein at least one of the plurality of special attributes comprise an expiration date associated with one of the file elements;

interpreting the special attributes using hierarchical inheritance to pass the special attributes from subordinate file elements to higher-level file elements;

creating a file-level representation of the interpreted special attributes, wherein the file-level representation of the interpreted special attributes indicates an earliest expiration date of the expiration dates associated with the file elements;

scanning the file-level representation of the interpreted special attributes to generate an expiration report using a hypothetical date and time different from a system calendar;

storing the file-level representation of the interpreted special attributes in a metadata associated with the file, wherein the metadata includes an index for locating each of the plurality of special attributes within the file;

based on a comparison of the expiration date to a reference date generating a warning that a selected file element is scheduled to expire; and wherein modification of the special attributes associated with the file elements is limited according to a security policy.

16. The computer program product of claim 15 wherein the metadata is accessible by one or more of a file system and an editor.

17. The computer program product of claim 15 wherein the special attributes further comprise one or more instances of an expiration date indicating a date that a selected file element is scheduled to expire.

18. The computer program product of claim 17 wherein the method further comprises:
   generating an interactive expiration report; and
   triggering an update of expired file elements in the interactive expiration report in response to an update request.

19. The computer program product of claim 15 wherein the special attributes are stored as intra-file metadata embedded within the file.

* * * * *